US007532878B2

(12) United States Patent
Hägebarth

(10) Patent No.: US 7,532,878 B2
(45) Date of Patent: May 12, 2009

(54) COMMUNICATION METHOD

(75) Inventor: Frank Hägebarth, Kirchheim (DE)

(73) Assignee: ALCATEL, Paris (FR)

( * ) Notice: Subject to any disclaimer, the term of this patent is extended or adjusted under 35 U.S.C. 154(b) by 508 days.

(21) Appl. No.: 11/016,857

(22) Filed: Dec. 21, 2004

(65) Prior Publication Data

US 2005/0185783 A1    Aug. 25, 2005

(30) Foreign Application Priority Data

Feb. 19, 2004   (EP)   ................... 04290450

(51) Int. Cl.
*H04M 3/42*   (2006.01)
(52) U.S. Cl. ............... 455/414.1; 379/215.01; 379/201.02; 455/41.2; 455/519; 340/539.15; 340/539.23
(58) Field of Classification Search ......... 455/415–416, 455/414.1, 412.1–2, 466, 41.2, 518–519, 455/458, 456.1; 379/201.02, 215.01; 707/5; 705/14; 709/219, 250; 463/41–42; 370/352, 370/338; 340/7.21, 7.25, 539.23
See application file for complete search history.

(56) References Cited

U.S. PATENT DOCUMENTS

| 4,682,367 | A | * | 7/1987 | Childress et al. ............... 455/17 |
| 5,086,394 | A | * | 2/1992 | Shapira ........................ 705/1 |
| 5,604,796 | A | * | 2/1997 | Yamazaki .............. 379/215.01 |
| 5,797,085 | A | * | 8/1998 | Beuk et al. .................... 455/88 |
| 5,920,845 | A | * | 7/1999 | Risemberg ...................... 705/1 |
| 5,963,951 | A | * | 10/1999 | Collins ........................ 707/102 |
| 6,020,810 | A | * | 2/2000 | Har-Even .................... 340/328 |
| 6,032,051 | A | * | 2/2000 | Hall et al. .................... 455/518 |
| 6,128,660 | A | * | 10/2000 | Grimm et al. ................ 709/227 |
| 6,150,937 | A | * | 11/2000 | Rackman ............... 340/539.23 |
| 6,249,282 | B1 | * | 6/2001 | Sutcliffe et al. .............. 715/751 |
| 6,253,091 | B1 | * | 6/2001 | Naddell et al. .............. 455/519 |
| 6,269,249 | B1 | * | 7/2001 | Ochiai ........................ 455/519 |
| 6,289,218 | B1 | * | 9/2001 | Liu ......................... 455/426.1 |
| 6,490,348 | B1 | * | 12/2002 | Oomori et al. ......... 379/215.01 |
| 6,504,920 | B1 | * | 1/2003 | Okon et al. ............ 379/121.01 |
| 6,549,768 | B1 | * | 4/2003 | Fraccaroli ................ 455/456.3 |
| 6,563,915 | B1 | * | 5/2003 | Salimando ............. 379/208.01 |
| 6,594,502 | B1 | * | 7/2003 | Koester .................... 455/414.1 |
| 6,665,389 | B1 | * | 12/2003 | Haste, III .................... 379/196 |
| 6,681,108 | B1 | * | 1/2004 | Terry et al. ............... 455/412.2 |
| 6,690,918 | B2 | * | 2/2004 | Evans et al. ................ 455/41.2 |

(Continued)

FOREIGN PATENT DOCUMENTS

WO    WO 2004004395 A1 *   1/2004

*Primary Examiner*—Sharad Rampuria
(74) *Attorney, Agent, or Firm*—Sughrue Mion, PLLC

(57) ABSTRACT

The invention relates to a method of having telecommunication connections as well as a mobile terminal and a contact server for executing this method. A mobile terminal logs on to a contact server that manages a personal profile of a first subscriber. A first communication connection is established between the mobile terminal of the first subscriber and a second subscriber whose personal profile matches with the personal profile of the first subscriber according to a search profile associated with the first subscriber. A response to a switch command, the first communication connection is interrupted and a second communication connection is established between the mobile terminal of the first subscriber and a third subscriber whose personal profile as well matches with the personal profile of the first subscriber according to the search profile.

9 Claims, 2 Drawing Sheets

U.S. PATENT DOCUMENTS

| | | | |
|---|---|---|---|
| 6,735,430 B1 * | 5/2004 | Farley et al. | 455/414.1 |
| 6,763,243 B2 * | 7/2004 | Wolf et al. | 455/519 |
| 6,788,946 B2 * | 9/2004 | Winchell et al. | 455/459 |
| 6,799,035 B1 * | 9/2004 | Cousins | 455/418 |
| 6,819,919 B1 * | 11/2004 | Tanaka | 455/414.1 |
| 6,896,263 B2 * | 5/2005 | Matthews | 273/249 |
| 6,898,436 B2 * | 5/2005 | Crockett et al. | 455/518 |
| 6,931,117 B2 * | 8/2005 | Roberts et al. | 379/215.01 |
| 6,968,179 B1 * | 11/2005 | De Vries | 455/414.1 |
| 6,978,136 B2 * | 12/2005 | Jenniges et al. | 455/435.1 |
| 7,058,164 B1 * | 6/2006 | Chan et al. | 379/88.17 |
| 7,254,406 B2 * | 8/2007 | Beros et al. | 455/456.3 |
| 7,310,676 B2 * | 12/2007 | Bourne | 709/227 |
| 2002/0072354 A1 * | 6/2002 | Kundaje et al. | 455/416 |
| 2002/0102999 A1 * | 8/2002 | Maggenti et al. | 455/518 |
| 2003/0083046 A1 * | 5/2003 | Mathis | 455/412 |
| 2003/0191673 A1 * | 10/2003 | Cohen | 705/5 |
| 2004/0002348 A1 * | 1/2004 | Fraccaroli | 455/456.3 |
| 2004/0005926 A1 * | 1/2004 | LeFroy | 463/42 |
| 2004/0006548 A1 * | 1/2004 | Mahmood | 707/1 |
| 2004/0014486 A1 * | 1/2004 | Carlton et al. | 455/550.1 |

* cited by examiner

COMMUNICATION METHOD

BACKGROUND OF THE INVENTION

The invention is based on a priority application EP 04290450.8 which is hereby incorporated by reference.

The present invention relates to a method of having telecommunication connections as well as a contact server for controlling telecommunication connections between subscribers of a telecommunication network and a mobile terminal for controlling such telecommunication connections.

Throughout history human beings have tried to contact persons who meet their requirements and to avoid contact persons who waste their time. Today, it is possible to use different kinds of dating services via the internet to contact a person who fulfills one's requirements.

For example, a person browses by an internet browser to a web site providing such dating service. The person fills an electronic form specifying personal data of the person, e.g. question concerning the person's age, hobbies or favorite radio channels, and a text field in which the person describes what kind of person he is looking for. Another person, who wants to check out the dating service browses to the web site of the dating service. The person fills an, electronic form for a search and the dating service searches for a person that matches the electronic form filled.

But, it is a drawback of such dating services that it is not possible to act on impulse and the user need an exhausting time to find an interesting person.

It is the object of the present invention to provide an improved contact service to subscribers of a telecommunication network.

SUMMARY OF THE INVENTION

The object of the present invention is achieved by a method of having telecommunication connections, the method comprising the steps of: logging on to a contact server that manages a personal profile of a first subscriber; establishing a first communication connection between a mobile terminal of the first subscriber and a second subscriber whose personal profile matches with the personal profile of the first subscriber according to a search profile associated with the first subscriber; and interrupting the first communication connection between the first and the second subscriber and establishing a second communication connection between the mobile terminal of the first subscriber and a third subscriber whose personal profile as well matches with the personal profile of the first subscriber according to the search profile.

The object of the invention is further achieved by a contact server for controlling telecommunication connection between subscriber of a telecommunication network, wherein the contact server comprises a database unit for administrating personal profiles of subscribers of the telecommunication network and further comprises a control unit for establishing a first communication connection between a mobile terminal of a first subscriber logged on to the contact server and a second subscriber whose personal profile matches with the personal profile of the first subscriber according to a search profile associated with the first subscriber and for interrupting the first communication connection between the first and the second subscriber and establishing a second communication connection between the mobile terminal of the first subscriber and a third subscriber whose personal profile as well matches with the personal profile of the first subscriber according to the search profile associated with the first subscriber. The object of the present invention is further achieved by a mobile terminal for controlling telecommunication connections between a first subscriber and a further subscriber of a telecommunication network, the mobile terminal comprises a control unit for logging on to a contact server that manages a personal profile of a first subscriber, for establishing a first communication connection between a mobile terminal of the first subscriber and a second subscriber whose personal profile matches with the personal profile of the first subscriber according to a search profile associated with a first subscriber and for interrupting the first communication connection between the first and the second subscriber and establishing a second communication connection between the mobile terminal of the first subscriber and a third subscriber whose personal profile as well matches with the personal profile of the first subscriber according to the search profile associated with the first subscriber.

The present invention makes it possible for a subscriber to switch to and between a number of matching partners in an easy, flexible and comfortable way. Fast and spontaneous contacts with varying groups of well matching partners becomes possible. For example, the present invention enables subscribers to switch between a number of matching partners just after a live event and share the common experiences. Further, the invention provides an attractive service which might create a high fee income for network operators.

Further advantages are achieved by the embodiments indicated by the dependent claims.

According to a preferred embodiment of the invention, the contact server assigns a live-modus to subscribers logged on to the contact server. Further, the assignment of the live-modus may depend on additional criteria, like the user profile assigned to the subscriber or an explicit command submitted by the subscriber. In the following, when the contact server is triggered to determine matching subscribers, the contact server selects a group of subscribers that are in the live-modus state and have a personal profile that matches with the personal profile of the first subscriber according to the search profile associated with the first subscriber. Due to this concept, it is possible for the first subscriber to move between a group of matching partners which are at the moment willing and capable to immediately establish a communication connection with a matching partner. It is immediately possible to establish a synchronous communication connection, for example a speech or video communication connection between matching partners and to switch between such communications.

Further, it is possible that the contact server determines for subscribers logged on to the contact server, whether these subscribers are busy or not and indicates such determined subscribers data information to the first subscriber. Information are submitted to the first subscriber indicating which of the matching subscribers of the group of matching subscribers are busy or not. This improves the possibility of the first subscriber to select and switch between communication partners as well as keeping an overview of the whole communication scenario. Further, it might be possible that the contact server determines additional communication data for busy subscribers that are in the live-modus state. For example, it could determine whether the present communication partner of such busy subscriber is a subscriber of the group of matching subscribers of the first subscriber or not. If the subscriber is one of the group of matching subscribers, it might gather additional information about the subscriber and may indicate these data as well as a group member marking to the first subscriber.

The personal profile of a subscriber contains a personal characteristic of the subscriber, for example photo of the subscriber, his birthday, specific interests and hobbies, as well as the location and/or activity the subscriber practices at the moment. The search profile of a subscriber specifies one or several of the information contained in the search profile which are of importance for the subscriber and shall be used as filter criteria's for selecting matching communication partners.

Preferably, the contact server downloads a list specifying subscribers of the group of matching subscribers to the mobile terminal associated with the first subscriber. The mobile terminal displays this list or part of this list to the first subscriber which is now in a position to select and switch between subscribers of the group. This approach assures to provide a fast and effective user interface and guaranties a quick switching between communication connections.

Preferably, the contact server updates this list on a regularly basis or triggered by a change of the information indicated to the first subscriber.

To improve the user friendliness of the service provided by the contact server, the contact server provides two kinds of interfaces: it provides a first interface for accessing the contact server via the mobile terminal, for example via a mobile phone. Further, it provides a second interface to access the contact server via a web-based terminal. This second interface is used by the subscriber to specify his personal profile and/or his search profile or profiles. For example, the subscriber specifies two or more search profiles and selects lateron one of these predefined search profiles via his mobile terminal. It is much more comfortable for the subscriber to input the information hold in his personal profile and/or his search profile via a web-based terminal since such terminal provides a much more comfortable user interface to the subsriber.

According to a preferred embodiment of the invention, the interruption of the first communication connection and the establishment of the second communication connection are controlled by a single command inputted by the first subscriber. Preferably, the mobile terminal comprises a switch button and a single press on the switch button initiates the switch between the first and the second communication. Such "switching" functionality improves the speech of switching between several communication partners and provides an attractive service which has the capacity to improve the fee income of the operator.

BRIEF DESCRIPTION OF THE DRAWINGS

These as well as other features and advantages of the invention may be better appreciated by reading the following detailed description of presently preferred exemplary embodiments taken in conjunction with accompanying drawings of which.

DETAILED DESCRIPTION OF THE DRAWINGS

Figure 1:
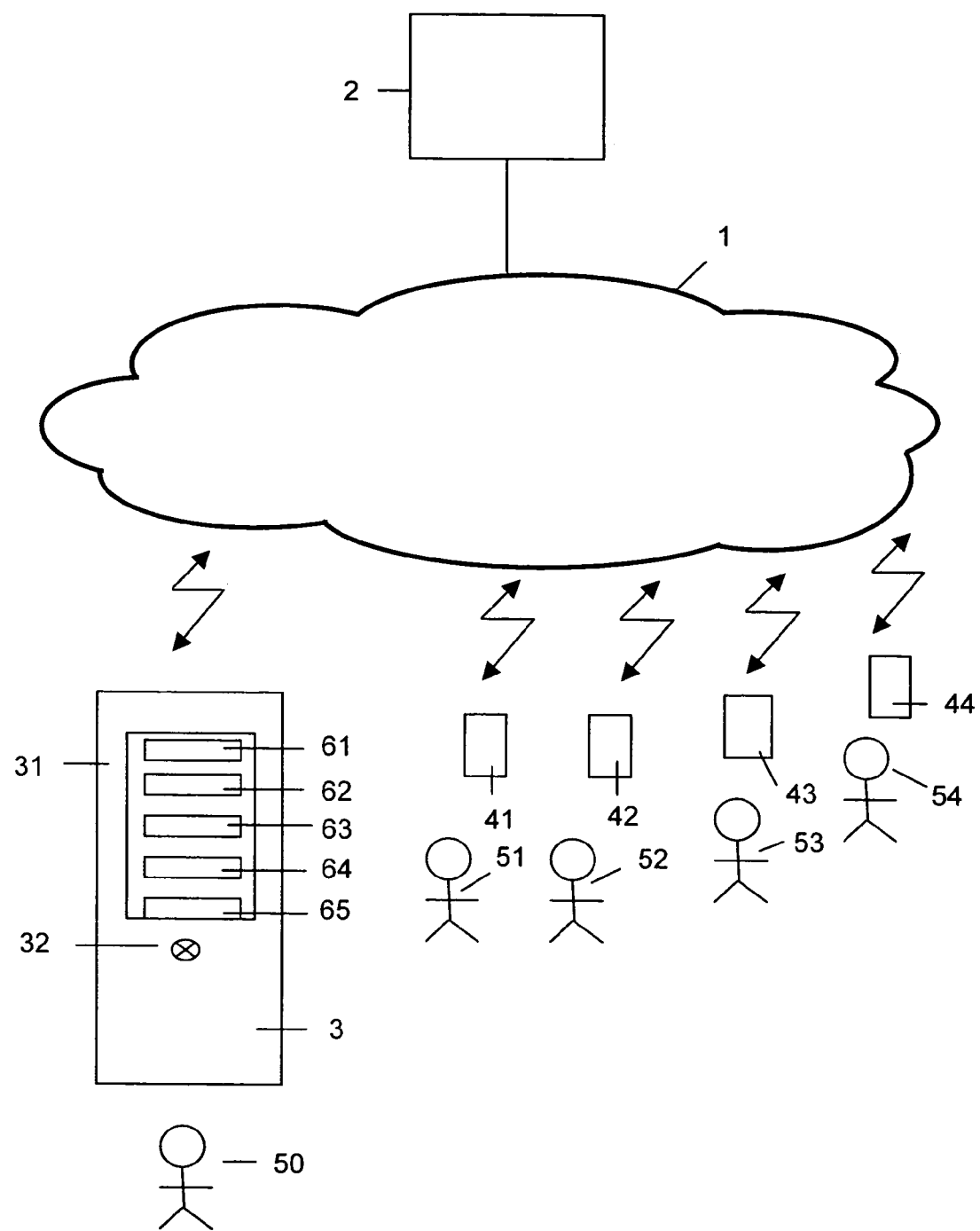
FIG. 1 is a block diagram of a communication system with a contact server and a mobile terminal according to the present invention.

FIG. 1 shows a communication network 1, a contact server 2, a plurality of mobile terminals 3, 41, 42, 43 and 44 and a plurality of subscribers 50 to 54 associated with these mobile terminals.

The communication network 1 is a cellular communication network, for example a GSM or UMTS network (GSM=Global System for Mobile Communications; UMTS=Universal Mobile Telecommunications System). Further, it is possible that the communication network 1 comprises beside one or several of such cellular radio networks one or several fixed communication networks, for example one or several PSTN or ISDN networks (PSTN=Public Switched Telecommunication Network; ISDN=Integrated Services Digital Network). Further, the communication network 1 may comprise one or several data networks, for example IP networks (IP=Internet Protocol). Such IP networks may be constituted by a plurality of different physical networks having a different MAC layers (MAC=Medium Access Protocol) interlinked via a common level 3 communication protocol, namely the IP protocol. Further, the communication network 1 may comprise one or several wireless access data networks, for example wireless LAN networks.

The mobile terminal 3, 41, 42, 43 and 44 interact with the communication network 1 via a radio interface, for example, via a GSM or UMTS interface. Preferably, these mobile terminals are mobile phones or cellular phones having the capability to establish a voice communication via the communication network 1. In addition to such voice communication, the mobile terminals 3, 41, 42, 43 and 44 preferably have the capability to establish a video communication or an asynchrone SMS or MMS communication via the communication network 1. (SMS=Short Message Service; MMS=Multi-Media Message Service).

The contact server 2 is a server connected with the communication-network 1 and having the capability to provide services within the communication network 1.

Preferably, the contact server 2 provides services by help of the IN-architecture (IN=Intelligent Network). In that case, the contact server 2 is constituted by a service control node (SCP=Service Control Point) interacting with specific exchanges of the communication network 1, the so-called service switching points, for providing services within the communication network 1.

But, it is also possible that the contact server 2 is a WAP or IP server connected with the communication network 1. Further, it is possible that the contact server 2 is a server controlling the provisioning of services according to another kind of service architecture, for example a server connected via a PARLEY interface.

The subscribers 50 to 54 are associated with the mobile terminals 3, 41, 42, 43 and 44, respectively.

Each of the subscribers 50 to 54 has a subscription for the contact service provided by the contact server 2.

The details of the service control and service provision of this contact service is in the following exemplified by help of the functionalities of the mobile terminal 3.

The mobile terminal 3 has, beside other components, a display 31 and a key pad with a switch button 32. The subscriber 50 has the choice between following operations to control the provisioning of the contact service:

In a first operation mode it is possible for the subscriber 50 to administrate and amend the personal profile and the search profiles hold for the subscribers 50 by the contact server 2. For example, it is possible for the subscriber 50 to input, amend and delete categories of his personal profile, add new search profiles, delete old search profiles and amend existing search profiles by help of the mobile terminal 3.

In a further operation mode, the subscriber 50 can log on to the server 2 and can select, whether the live-modus shall be assigned to his personal profile.

In a further operation mode, the subscriber 10 can select one of the predefined search profiles, modify a new search profile or modify a predefined search profile and initiate a search for matching communication partners. Preferably, the operations of this mode are initiated via the user interface of the mobile terminal 3 and executed by the contact server 2. For example, the contact server 2 executes a query to determine a group of matching communication partners whose personal profiles matches with the personal profile of the subscriber 50 according to the search profile of the subscriber 50 specified in this operation mode.

In a further operation mode, the subscriber 50 can select and switch between communication connections with subscribers, whose personal profiles match with the personal profile of the subscriber 50 according to the search profile specified within the aforementioned operation mode. For example, FIG. 1 shows five items 61 to 65 displayed by the display 31 of the mobile terminal 3. Each of these items represent one matching communication partner which fulfils the aforementioned criteria. Preferably, there is a scroll functionality which makes it possible for the user to scroll within a list of matching communication partners. Thereby, it is not necessary that all of these communication partners are at the same time displayed on the display 31 and that the subscriber 50 can freely navigate by the switch button 32 between items representing these matching communication partners.

For example, each of the items 61 to 65 indicate the name of the respective partner, additional data about the respective partner, which are selected by the subscriber 50 within his personal profile, or search profile and a marker indicating whether the respective communication partner is busy or not. Further, the items 61 to 65 may display additional information about a busy communication partner, for example, whether he is communicating with one of the other displayed matching communication partners, and the name or a link to this communication partner.

As already mentioned above, the subscriber 50 navigates by help of the switch buttons 32 between the items 61 to 65, e.g. by moving the switch button 32 up or down. The respective item is indicated to the subscriber 50 e.g. by a different brightness of the item or by a color change. On a single push to the switch button 32, a communication connection between the mobile terminal 3 of the subscriber 50 and the subscriber represented by the respective active item is established. During conversation with the selected matching communication partner, for example with the subscriber 51, the subscriber 50 may navigate to one of the other items 61 to 65. On a single further press to the switching button 32, the communication connection between the mobile terminals 3 and 41 is interrupted and a further communication connection between the terminal 3 and the subscriber represented by the newly selected item is established. During this communication, for example with the subscriber 52, the subscriber 50 may navigate to one of the other item and may interrupt the existing connection and establish a new communication connection by a single further press on the switching button 32.

The user interface of the mobile terminal 3 provides the ability to the user 50 to navigate between all of the aforementioned operation modes via a pure interactive graphical user interface. Thereby, it becomes possible for the subscriber 50 to log on to the contact server 2, searching for valuing and available matching contact partners and switching between communications with these partners by help of a few presses to one or several buttons of the mobile terminal 3.

In the following, the details of the invention are exemplified by help of FIG. 2.

Figure 2:
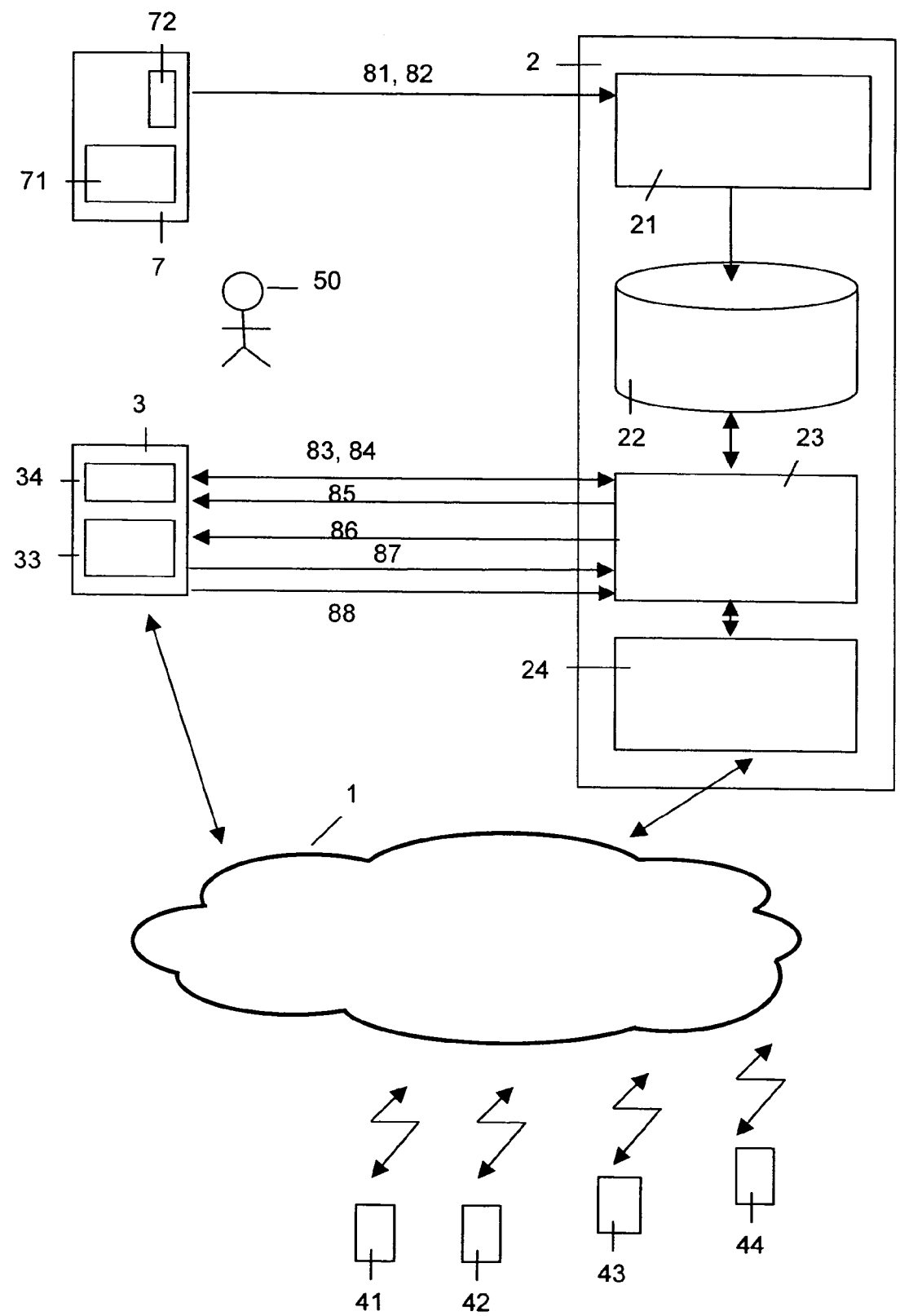
FIG. 2 is a functional view of the communication system of FIG. 1 which indicates the interactions between the contact server and the mobile terminals of FIG. 1.

FIG. 2 shows the communication network 1, the mobile terminals 3, 41, 42, 43 and 44, a web-based terminal 7, the subscriber 50 and the contact server 2.

According to the embodiment of FIG. 2, the subscriber 50 uses the web-based terminal 7 for specifying his personal profile and his search profiles. Further, he controls the aforementioned operation modes by help of his mobile terminal 3.

The web-based terminal 7 is a terminal having the capability to interact with the contact server 2 via a web-based interface. For example, the web-based terminal 7 is a computer equipped with a web-browser and a communication unit for communicating via an IP-protocol with the contact server 2. From functional point of view, the web-based terminal 7 comprises a system platform 71 and an application program 72 handling the specific functionalities that provide the user interface to the contact server 2.

From the functional point of view, the mobile terminal 3 have a system platform 33 comprising all of the basic functionalities of a mobile phone and an additional application program 34 handling the client part of the aforementioned operation modes. It is possible to install the application program 34 during manufacturing of the mobile terminal 3, at the point of sales, or lateron by downloading this application program from the contact server 2 or downloading it via a short distance interface to the terminal 3, for example via an infrared or bluetooth interface.

Further, it is possible that the control of the service provided by the contact server 2 is implemented by help of the WAP-protocol or by help of a browser already installed on the terminal 3 (WAP=Wireless Application Protocol). In such case, it is not necessary to implement the additional application program 34 within the terminal 3.

The contact server 2 is constituted by one or several interconnected computers by a software platform executed by this hardware platform and by several application programs executed on the system platform formed by the aforementioned hardware and software platform. From functional point of view, the contact server 2 comprises three control units 21, 23 and 24 and a data base unit 22.

The control unit 21 provides a web-based access interface for subscribers of the contact service. The control unit 21 provides via such interface a graphical user interface enabling the subscriber to execute the aforementioned operations of creating and amending his personal profile, creating, amending and deleting his search profiles and administrating his personal profile and his search profiles. Further, the control unit 21 executes authorization procedures for checking the authentication and authorization of an accessing subscriber.

The data base unit 2 stores the personal profiles and search profiles of the subscriber subscribed to the service provided by the contact server 2. Preferably, each personal profile of a subscriber includes data about the name of the subscriber (e.g. selected by the subscriber), a photo of the subscriber and various categories that are predefined or individual specified by the subscriber. These categories may comprise the date of birth of the subscriber, hobbies and interests of the subscriber or a short-self-portrait of the subscriber. Further, these categories may comprise dynamic information, for example the present location of the subscriber or his presence activity. Preferably, the control unit 21 automatically updates such data, for example through contacting a mobility server and matching the received data with a preference profile of the subscriber. But, it is also possible that the subscriber himself updates these data via his mobile phone.

The search profiles specify one or several of these categories of the personal profiles that are of specific interest. A subscriber may specify a plurality of such search profile. Lateron he will be in a position to select between different of such profiles by a single press to a button of his mobile terminal.

For example, the subscriber 50 accesses the control unit 21 of the contact server 2 via his web-based terminal 7. After execution of an authorization and authentication procedure, the subscriber 50 has the option to administrate and modify his personal profile and his search profiles. For example, the subscriber 50 submits data 81 to the control unit 21 which specify his personal profile and submits data 82 to the control unit 21 which specify a search profile. In the following, the subscriber 50 is in a position to control the service provided by the contact server 2 via a few presses to buttons of his mobile terminal 3.

The control unit 23 provides an access interface to the mobile terminals of the subscribers subscribed to the service provided by the contact server 2. If such subscriber, for example the subscriber 50, intends to have contacts via the contact service provided by the contact server 2, it logs on to the server 2. For example, the subscriber 50 navigates within the menu to the operation "log on to contact service", initiates the execution of this operation. Then, the mobile terminal 3 sends a respective command message 83 to the control unit 23 of the contact server 2. After execution of an authentication and authorization procedure, the control unit 23 accepts the logging of the mobile terminal 3 and registers the status of the subscriber 50 within the database unit 22. Further, it is possible that the control unit 23 automatically assigns a live-modus state to the subscriber 50. Alternatively, it is also possible that the assignment of the live-modus state is initiated by a specific command inputted by the subscriber 50.

All subscribers that are in the live-mode state are recognized by the control unit 23 as subscribers that are willing to have communication contacts with matching communication partners.

If the subscriber 50 intends to play an active role and contact a matching communication partner, it selects the respective operation in the menu and initiates a search operation based on one of his predefined search profiles. The mobile terminal 3 sends a respective command message 84 to the control unit 23. In the following, the control unit 23 accesses the data base unit 22 and searches for all subscribers whose personal profile matches with the personal profile of the subscriber 50 according to the search profile selected by the subscriber 50. Then, it selects from these subscribers all subscribers, which are in the live-modus state. The remaining group of subscribers forms the group of matching communication partners. Then, the control unit 23 transmits a list comprising all or a selective part of this matching communication partners to the mobile terminal 3. The number of transmitted communication partners may depend on the number of determined communication partners as well as on additional filter criteria's, for example the present location of these communication partners. The terminal 3 receives such list 85, stores the list and displays the list as described by hand of FIG. 1. If there are any changes in the list of matching communication partners, the control unit 23 transmits an update 86 to the terminal 3.

If the subscriber 50 has selected one of the displayed communication partners or switches to another one of the displayed communication partners, the mobile terminal 3 sends command messages 87 and 88 to the control unit 23, respectively. The control unit 23 forwards the received control messages 87 and 88 to the control unit 24 which is responsible for controlling the establishment of communication connections between subscribers enrolled in the database unit 22.

The control unit 24 receives the commands 87 and 88 forwarded by the control unit 23 and creates corresponding command messages initiating the establishment and termination of communications connections through exchanges of the communication network 1. For example, control unit 24 creates respective INAP messages and transfers these messages via the number 7 signaling system to the respective exchanges of the communication network (INAP=Intelligent Network Application Protocol). Further, it is possible that the control unit 24 keeps a number of communication connections with subscribers logged on to the contact server 2 like a conference bridge and execute switching operations between such connections to initiating the establishment and interruption of communication connections between such subscribers.

The control unit 24 may control the establishment and termination of voice, data and video connections between mobile terminals assigned to subscribers of the contact server 2.

Further, it is also possible to have a contact server which is not equipped with the control unit 24. In that case, the establishment and interruption of communication connection is initiated by the mobile terminal 3 itself, e.g. by sending respective signaling messages to the associated exchange of the communication network 1. Although in this case, the mobile terminal may initiate speech, video or data communications. Further, it is also possible to initiate a SMS or MMS communication connection by help of the aforementioned system. In case of such asynchrone connection, it is not necessary to supervise the live-modus state and perform a selection based on this criteria.

The invention claim is:

1. A method of having telecommunication connections, the method comprising:
    logging on to a contact server that manages a personal profile of a first subscriber;
    establishing a first communication connection between a mobile terminal of the first subscriber and a second subscriber whose personal profile matches with the personal profile of the first subscriber according to a search profile associated with the first subscriber;
    interrupting the first communication connection between the first and the second subscriber and establishing a second communication connection between the mobile terminal of the first subscriber and a third subscriber whose personal profile as well matches with the personal profile of the first subscriber according to the search profile;
    assigning a live-modus to subscribers logged on to the contact server; and
    selecting a group of two or more matching subscribers, the matching subscribers being in the live-modus and having a personal profile that matches with the personal profile of the first subscriber according to the search profile associated with the first subscriber.

2. The method of claim 1 further comprising determining for subscribers whether the subscribers are busy; and indicating to the first subscriber such subscriber data of subscribers of the group of matching subscribers.

3. The method of claim 1 further comprising downloading a list from the contact server to the mobile terminal associated with the first subscriber; and displaying the list or part of the list by the mobile terminal, the list specifying subscribers of the group of matching subscribers.

4. The method of claim 3, further comprising updating the list.

5. The method of claim 1, further comprising controlling the interruption of the first communication connection and the establishment of the second communication connection by a single command input by the first subscriber.

6. The method of claim 1, further comprising that the first subscriber uses a mobile phone terminal for the communication with the second and third subscribers and the first subscriber accesses the contact server via a web-based terminal for specifying the personal profile and/or the search profile of the first subscriber.

7. A contact server for controlling telecommunication connections between subscribers of a telecommunication network, the contact server comprising:
- a data base unit for administrating personal profiles of subscribers of the telecommunication network; and
- a control unit for establishing a first communication connection between a mobile terminal of a first subscriber logged on to the contact server and a second subscriber whose personal profile matches with the personal profile of the first subscriber according to a search profile associated with the first subscriber, and for interrupting the first communication connection between the first and the second subscriber and establishing a second communication connection between the mobile terminal of the first subscriber and a third subscriber whose personal profile as well matches with the personal profile of the first subscriber according to the search profile associated with the first subscriber,
- wherein a live-modus is assigned to subscribers logged on to the contact server, and a group of two or more matching subscribers is selected, the matching subscribers being in the live-modus and having a personal profile that matches with the personal profile of the first subscriber according to the search profile associated with the first subscriber.

8. A mobile terminal for controlling telecommunication connections between a first subscriber and further subscribers of a telecommunication network, the mobile terminal comprising a control unit for logging on to a contact server that manages a personal profile of the first subscriber, for establishing a first communication connection between the first subscriber and a second subscriber whose personal profile matches with the personal profile of the first subscriber according to a search profile associated with the first subscriber and for interrupting the first communication connection between the first and the second subscriber and establishing a second communication connection between the first subscriber and a third subscriber whose personal profile as well matches with the personal profile of the first subscriber according to the search profile associated with the first subscriber,
- wherein a live-modus is assigned to subscribers logged on to the contact server, and a group of two or more matching subscribers is selected, the matching subscribers being in the live-modus and having a personal profile that matches with the personal profile of the first subscriber according to the search profile associated with the first subscriber.

9. The mobile terminal of claim 8, further comprising a display unit for displaying a list including the second and third subscribers and a control button for controlling the establishment of the first communication as well as the interruption of the first communication and the establishment of the second communication.

* * * * *